US006480150B2

(12) United States Patent
Falk et al.

(10) Patent No.: US 6,480,150 B2
(45) Date of Patent: *Nov. 12, 2002

(54) AUTONOMOUS HARDWIRED TRACKING LOOP COPROCESSOR FOR GPS AND WAAS RECEIVER

(75) Inventors: Henry D. Falk, Long Beach; Leon Kuo-Liang Peng, Mountain View; Wesley F. Marumo, Cypress, all of CA (US)

(73) Assignee: SiRF Technology, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/871,394

(22) Filed: May 31, 2001

(65) Prior Publication Data

US 2001/0048388 A1 Dec. 6, 2001

Related U.S. Application Data

(63) Continuation of application No. 09/397,438, filed on Sep. 17, 1999.

(51) Int. Cl.[7] ............................ G01S 5/02; H04B 7/185; G06G 7/78; H04L 27/06
(52) U.S. Cl. .................... 342/357.12; 375/344; 701/213
(58) Field of Search ...................... 342/357.12; 375/316, 375/344; 701/213

(56) References Cited

U.S. PATENT DOCUMENTS

| 4,426,712 A | * | 1/1984 | Gorski-Popiel |
| 4,445,118 A | * | 4/1984 | Taylor et al. |
| 4,463,357 A | * | 7/1984 | MacDoran |
| 4,578,678 A | * | 3/1986 | Hurd |
| 4,667,203 A | * | 5/1987 | Counselman, III |
| 4,701,934 A | * | 10/1987 | Jasper |

(List continued on next page.)

FOREIGN PATENT DOCUMENTS

| EP | WO 90/11652 | 10/1990 |
| EP | 0511741 | 11/1992 |
| GB | 2115195 | 1/1983 |
| JP | 58-105632 | 6/1983 |
| JP | 7-36035 | 5/1986 |
| JP | 4-326079 | 11/1992 |

OTHER PUBLICATIONS

Mark Moeglein et al., document, "An Introduction to Snap Track™ Server–Aided GPS Technology", 11pp, (undated).

Mark Markoff, As Seen in *The New York Times*: Deals to Move Global Positioning Technology Toward Everyday Use, Article, *The New York Tiems*, © 1998, 1pp.

*Primary Examiner*—Thomas H. Tarcza
*Assistant Examiner*—Fred H Mull
(74) *Attorney, Agent, or Firm*—Thomas, Kayden, Horstemeyer & Risley, L.L.P.

(57) ABSTRACT

An autonomous Hardwired Tracking Loop (HWTL) ASIC comprising a HWTL coprocessor provided for implementing most of the receiver processing function for data acquisition and tracking functions of a radio receiver system in dedicated hardware. With the expanded functionality provided by an HWTL coprocessor in the autonomous HWTL ASIC, the interruption of CPU performing the navigation processing is significantly reduced to thereby maximize throughput and minimize power burden on the microprocessor. In the preferred embodiment, the HWTL ASIC also comprises the CPU and a correlator, wherein the correlator provides the high rate greater than approximately 1 KHz signal processing operations, the HWTL coprocessor providing the data acquisition and tracking (medium frequency signal processing) operations, and the CPU thereby freed to provide more bandwidth for lower frequency processing, i.e., navigation and non-radio receiver operations, such as user applications, processing requiring CPU intervention at approximately 10 Hz or less CPU processing rate.

36 Claims, 9 Drawing Sheets

U.S. PATENT DOCUMENTS

| | | | |
|---|---|---|---|
| 4,754,465 A | * | 6/1988 | Trimble |
| 4,785,463 A | * | 11/1988 | Jane et al. |
| 4,809,005 A | * | 2/1989 | Counselman, III |
| 4,821,294 A | * | 4/1989 | Thomas, Jr. |
| 4,884,041 A | * | 11/1989 | Walker |
| 4,890,233 A | * | 12/1989 | Ando et al. |
| 4,894,662 A | * | 1/1990 | Counselman |
| 4,998,111 A | * | 3/1991 | Ma et al. |
| 5,014,066 A | * | 5/1991 | Counselman, III |
| 5,036,329 A | * | 7/1991 | Ando |
| 5,043,736 A | * | 8/1991 | Darnell et al. |
| 5,108,334 A | * | 4/1992 | Eschenbach et al. |
| 5,172,076 A | * | 12/1992 | Brown |
| 5,202,829 A | * | 4/1993 | Geier |
| 5,225,842 A | * | 7/1993 | Brown et al. |
| 5,293,170 A | * | 3/1994 | Lorenz et al. |
| 5,311,195 A | * | 5/1994 | Mathis et al. |
| 5,323,164 A | | 6/1994 | Endo |
| 5,343,209 A | | 8/1994 | Sennott et al. |
| 5,345,244 A | | 9/1994 | Gildea et al. |
| 5,347,536 A | | 9/1994 | Meehan |
| 5,379,224 A | | 1/1995 | Brown et al. |
| 5,402,347 A | | 3/1995 | McBurney et al. |
| 5,416,712 A | | 5/1995 | Geier et al. |
| 5,418,538 A | | 5/1995 | Lau |
| 5,420,592 A | | 5/1995 | Johnson |
| 5,420,593 A | | 5/1995 | Niles |
| 5,440,313 A | | 8/1995 | Osterdock et al. |
| 5,450,344 A | | 9/1995 | Woo et al. |
| 5,489,878 A | | 2/1996 | Gilbert |
| 5,504,684 A | | 4/1996 | Lau et al. |
| 5,548,553 A | | 8/1996 | Cooper et al. |
| 5,592,173 A | | 1/1997 | Lau et al. |
| 5,623,414 A | | 4/1997 | Misra |
| 5,625,668 A | | 4/1997 | Loomis et al. |
| 5,635,879 A | | 6/1997 | Sutardja et al. |
| 5,663,734 A | | 9/1997 | Krasner |
| 5,663,735 A | | 9/1997 | Eshenbach |
| 5,764,184 A | | 6/1998 | Hatch et al. |
| 5,781,156 A | | 7/1998 | Krasner |
| 5,786,789 A | | 7/1998 | Janky |
| 5,796,662 A | | 8/1998 | Kalter et al. |
| 5,812,087 A | | 9/1998 | Krasner |
| 5,825,327 A | | 10/1998 | Krasner |
| 5,828,694 A | | 10/1998 | Schipper |
| 5,831,574 A | | 11/1998 | Krasner |
| 5,841,396 A | | 11/1998 | Krasner |
| 5,845,203 A | | 12/1998 | LaDue |
| 5,854,605 A | | 12/1998 | Gildea |
| 5,874,914 A | | 2/1999 | Krasner |
| 5,877,724 A | | 3/1999 | Davis |
| 5,877,725 A | | 3/1999 | Kalafus |
| 5,883,594 A | | 3/1999 | Lau |
| 5,884,214 A | | 3/1999 | Krasner |
| 5,889,474 A | | 3/1999 | LaDue |
| 5,897,605 A | | 4/1999 | Kohli et al. |
| 5,901,171 A | | 5/1999 | Kohli et al. |
| 5,903,654 A | | 5/1999 | Milton et al. |
| 5,907,809 A | | 5/1999 | Molnar et al. |
| 5,917,383 A | | 6/1999 | Tso et al. |
| 5,917,444 A | | 6/1999 | Loomis et al. |
| 5,920,283 A | | 7/1999 | Shaheen et al. |
| 5,923,703 A | | 7/1999 | Pon et al. |
| 5,926,131 A | | 7/1999 | Sakumoto et al. |
| 5,936,572 A | | 8/1999 | Loomis et al. |
| 5,943,363 A | | 8/1999 | Hanson et al. |
| 5,945,944 A | | 8/1999 | Krasner |
| 5,963,582 A | | 10/1999 | Stansell, Jr. |
| 5,977,909 A | | 11/1999 | Harrison et al. |
| 5,982,324 A | | 11/1999 | Watters et al. |
| 5,983,109 A | | 11/1999 | Montoya |
| 5,987,016 A | | 11/1999 | He |
| 5,999,124 A | | 12/1999 | Sheynblat |
| 5,999,125 A | | 12/1999 | Kurby |
| 6,002,362 A | | 12/1999 | Gudat |
| 6,002,363 A | | 12/1999 | Krasner |
| 6,009,551 A | | 12/1999 | Sheynblat |
| 6,011,509 A | | 1/2000 | Dutka |
| 6,014,101 A | | 1/2000 | Loomis |
| 6,016,119 A | | 1/2000 | Krasner |
| 6,041,222 A | | 2/2000 | Horton et al. |
| 6,047,017 A | | 4/2000 | Cahn et al. |
| 6,052,081 A | | 4/2000 | Krasner |
| 6,061,018 A | | 5/2000 | Sheynblat |
| 6,064,336 A | | 5/2000 | Krasner |
| 6,104,338 A | | 8/2000 | Krasner |
| 6,104,340 A | | 8/2000 | Krasner |
| 6,107,960 A | | 8/2000 | Krasner |
| 6,111,540 A | | 8/2000 | Krasner |
| 6,131,067 A | | 10/2000 | Girerd et al. |
| 6,133,871 A | | 10/2000 | Krasner |
| 6,133,873 A | | 10/2000 | Krasner |
| 6,133,874 A | | 10/2000 | Krasner |
| 6,150,980 A | | 11/2000 | Krasner |
| 6,188,351 B1 | * | 2/2001 | Bloebaum |
| 6,204,808 B1 | * | 3/2001 | Bloebaum et al. |
| 6,211,817 B1 | * | 4/2001 | Eschenbach |
| 6,211,819 B1 | * | 4/2001 | King et al. |
| 6,222,483 B1 | * | 4/2001 | Twitchell et al. |
| 6,229,478 B1 | * | 5/2001 | Biacs et al. |
| 6,239,742 B1 | * | 5/2001 | Krasner |

* cited by examiner

PRIOR ART IMPLEMENTATION #1

PRIOR ART IMPLEMENTATION #2

AUTONOMOUS HARDWIRED TRACKING LOOP COPROCESSOR FOR GPS AND WAAS RECEIVER

CROSS REFERENCE TO RELATED APPLICATIONS

This is a continuation of application Ser. No. 09/397,438, filed Sep. 17, 1999, entitled "AUTONOMOUS HARDWIRED TRACKING LOOP COPROCESSOR FOR GPS AND WAAS RECEIVER", which application is incorporated herein by reference.

FIELD OF INVENTION

This invention relates to the field of GPS receivers.

BACKGROUND OF INVENTION

The Global Positioning System is a navigation system that can be used to provide a user with accurate position and time. It consists of a constellation of GPS satellites that broadcast the GPS signal, ground stations to control those satellites, and radio receivers such as shown in FIGS. 1A and 1B to capture the GPS signals and extract navigation information from them. Encoded on the transmissions of each satellite are messages that indicate the location of the satellite and time of transmission of the signal. By acquiring the signal of four satellites, and by performing calculations to determine the difference between the time of transmission and time of reception by the user equipment, a user can triangulate and determine latitude, longitude, elevation, and time. As illustrated in both prior art radio receiver implementations of FIGS. 1A and 1B, a typical GPS radio receiver comprises an antenna 12 up front to capture a GPS signal 13 broadcasted from a satellite. A RF front end 14 uses a reference oscillator 16 to down convert input RF signal 13 to an analog IF signal 15. An analog to digital converter (A/D) 18 samples analog IF signal 15 and converts it into a digital IF output 19. IF signal 19 then undergoes digital signal processing comprising essentially three levels of signal processing illustrated in Table 1 below.

TABLE 1

Receiver Functionality vs. Processing Rate Frequency

| | FUNCTIONALITY | | |
|---|---|---|---|
| | Signal Sampling & Correlation (i.e., correlation, replicating P or C/A code) | Receiver Processing (i.e., Tracking Loops, Bit Synchronization, Data Demod, etc.) | Navigation & Other Processing (i.e., Calculations of Position & Time, User Applications) |
| Processing Frequency | High rates (i.e., 50 MHz to 1 KHz) | Medium rates (i.e., 1 KHz to 10 Hz) | Low rates (i.e., 10 Hz and slower) |
| FIG. 1A Prior Art Scheme | ASIC (i.e., Correlator 20) performs process | CPU #1 (i.e., CPU 22) performs receiver processing, navigation & other processing (interrupted at medium rate) | |
| FIG. 1B Prior Art Scheme | ASIC (i.e., Correlator 20) performs process | CPU #1 (i.e., CPU 22) performs receiver processing (interrupt at medium rate) | CPU #2 (i.e., CPU 26) navigation & other processing (interrupt at low rate) |

The three levels of signal processing can be quantified according to the functions and processing frequency expected at each stage of processing. A first stage consists of signal sampling and correlation processing that is (CPU) intensive and operates at very high frequency processing rate such as typically between 1 KHz to 50 MHz processing rate. This correlation processing stage comprises processing various steps that compare (or correlate) digitized signal 19 with a locally generated code that attempts to replicate the P or C/A code generated by a satellite. The replica code searches a "space" that consists of the unique codes generated by the different satellites, the temporal portion of the code being sent at any given time, and the Doppler frequency offset caused by the relative motion of the satellite and user. Generally, the Correlator Engine (such as) Correlator 20 of FIGS. 1A and 1B) performs parallel correlations with multiple code position/Doppler value combinations simultaneously in a multiple channel fashion, usually up to 12.

A second stage shown in Table 1, referred to as the receiver processing, typically comprises performing tracking loop function, bit synchronization, data demodulation, and other such typical signal processes running at a medium rate of 1 KHz to 10 Hz signal processing rate requirement. Finally, a third stage of signal processing illustrated in Table 1 comprises low frequency rate signal processing of 10 Hz or slower processes typically found in navigation processing, such as calculation of position and time.

As summarized in Table 1, typical prior art implementation of FIG. 1A provides that the high rate signal sampling and correlation functions are performed by a Correlator ASIC 20, while all other remaining medium to low level processing is performed by a receiver CPU 22. This implementation presents a substantial drawback in that the receiver CPU 22 is overly burden with the still intensive processing requirements expected of the typical receiver processing function (i.e., 1 KHz to 10 Hz rate processing) that competes with the navigation processing and other non-GPS applications, including user applications. Moreover, as also summarized in Table 1, prior art implementation of FIG. 1B of providing two CPUs (a receiver CPU 22 and a navigation process CPU 26) to segregate and offload the medium frequency rate processes from the navigation CPU thus provides more time for that CPU to allocate to other non-GPS processing. However, prior art scheme of having a second CPU results in substantial increase to cost and silicon.

Accordingly, for typical radio receiver applications, either a more powerful CPU (with increased power consumption) needs to be used, or user desired software applications suffer from the microprocessor limited bandwidth to service both the correlator engine operations as well as the typical GPS receiver and navigational processing. There is therefore a dire need to off load the functions of the microprocessor in a GPS receiver system, while still servicing the needs of correlator engine operations and maintain the GPS receiver system performance.

SUMMARY OF INVENTION

An autonomous Hardwired Tracking Loop (HWTL) radio receiver comprising a CPU, a Correlator Engine (a "Correlator") and a Hardwired Tracking Loop ("HWTL") coprocessor is provided in accordance with the principles of this invention. The HWTL coprocessor provided in a HWTL integrated circuit executes acquisition and tracking procedures in radio receivers, such as a GPS and WAAS receiver that have traditionally been executed in software by the CPU. Accordingly, providing a HWTL coprocessor frees up the CPU to perform various other critical navigational and user desired applications, while minimizing the cost and real estate required. In the preferred embodiment, the Correlator Engine, the HWTL coprocessor, and the CPU are all integrated on a single integrated circuit to minimize power consumption and lowers cost and also to relax the GPS receiver system's CPU requirements to allow the CPU more bandwidth to address user applications and lower CPU frequency intensive signal processing that are 10 Hz or less.

The receiver processing functions performed by the HWTL coprocessor include typical acquisition and tracking functions such as, for example, carrier loops, code loops, code lock detect, costas lock detect, bit synchronization, data demodulation, and SNR data gathering. The HWTL coprocessor implements the search processing for initial acquisition or reacquisition to track as well as controlling exit processing of track to reacquisition, as determined by CPU programmable parameters. The HWTL coprocessor can operate on a single channel in initial acquisition or on up to twelve channels in reacquisition or track. If the HWTL coprocessor is operating in reacquisition/track mode, then one of the channels may be a WAAS channel.

DETAILED DESCRIPTION OF PREFERRED EMBODIMENT(S)

Structural Implementation

Figure 1A:
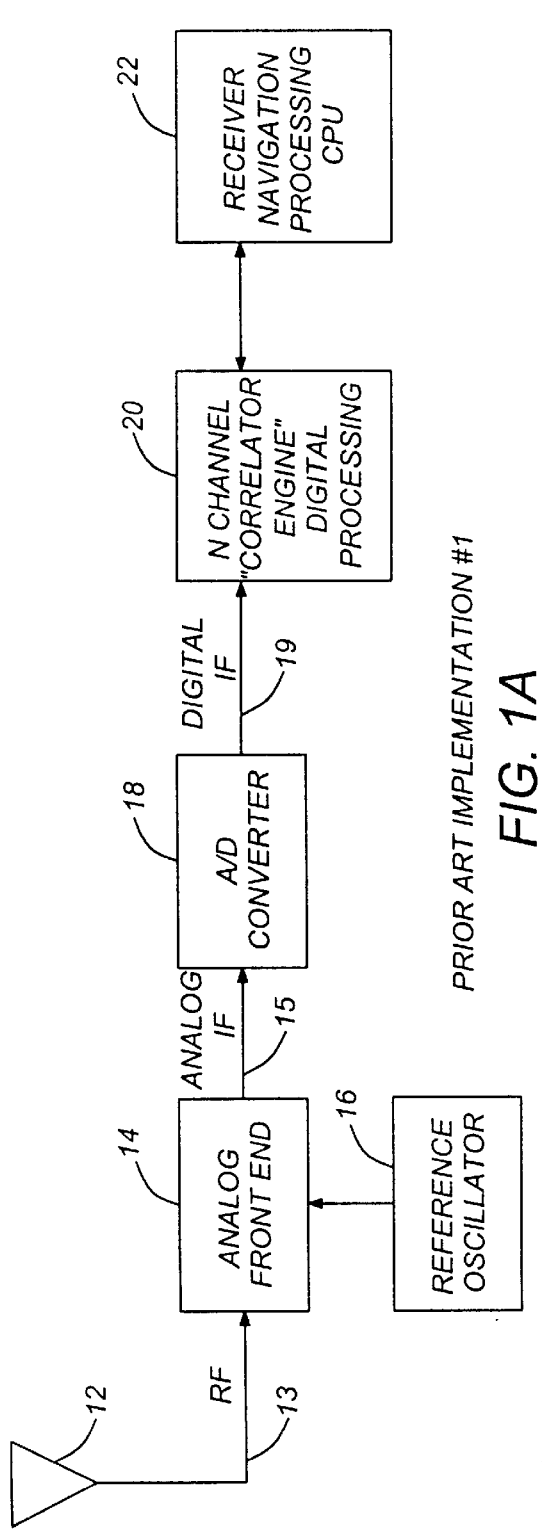
FIG. 1A is a block diagram illustrates a typical prior art GPS receiver.
Figure 1B:
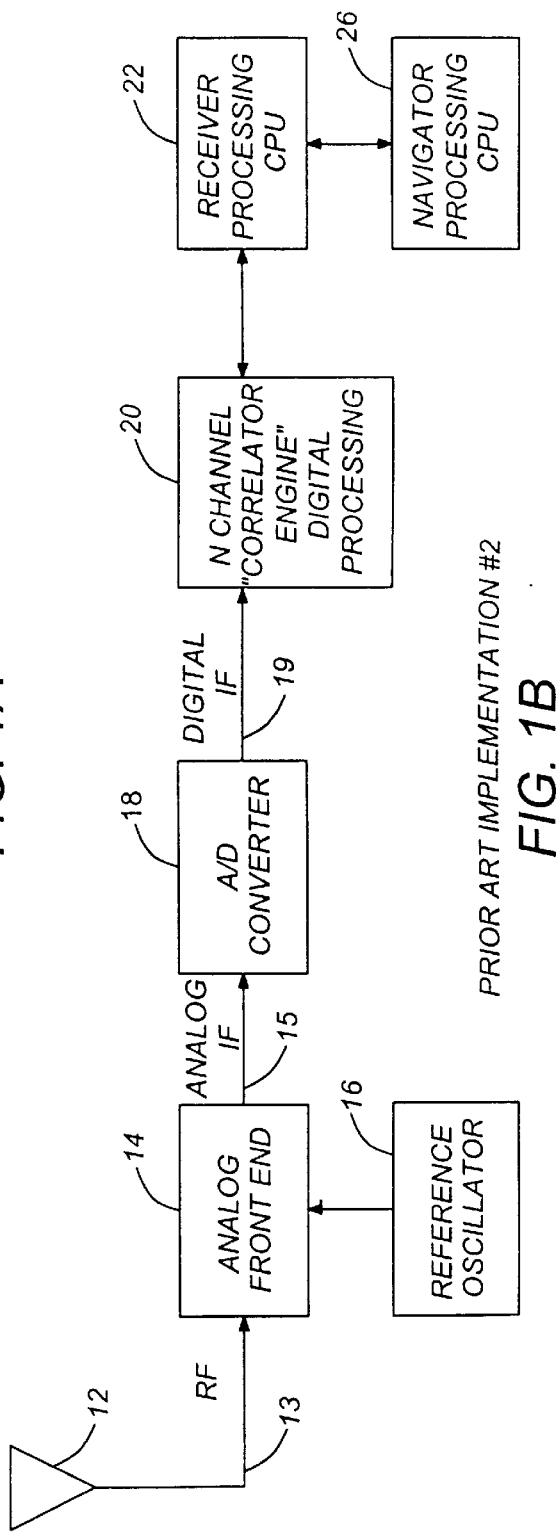
FIG. 1B is a block diagram illustrating another typical prior art GPS receiver.
Figure 2:
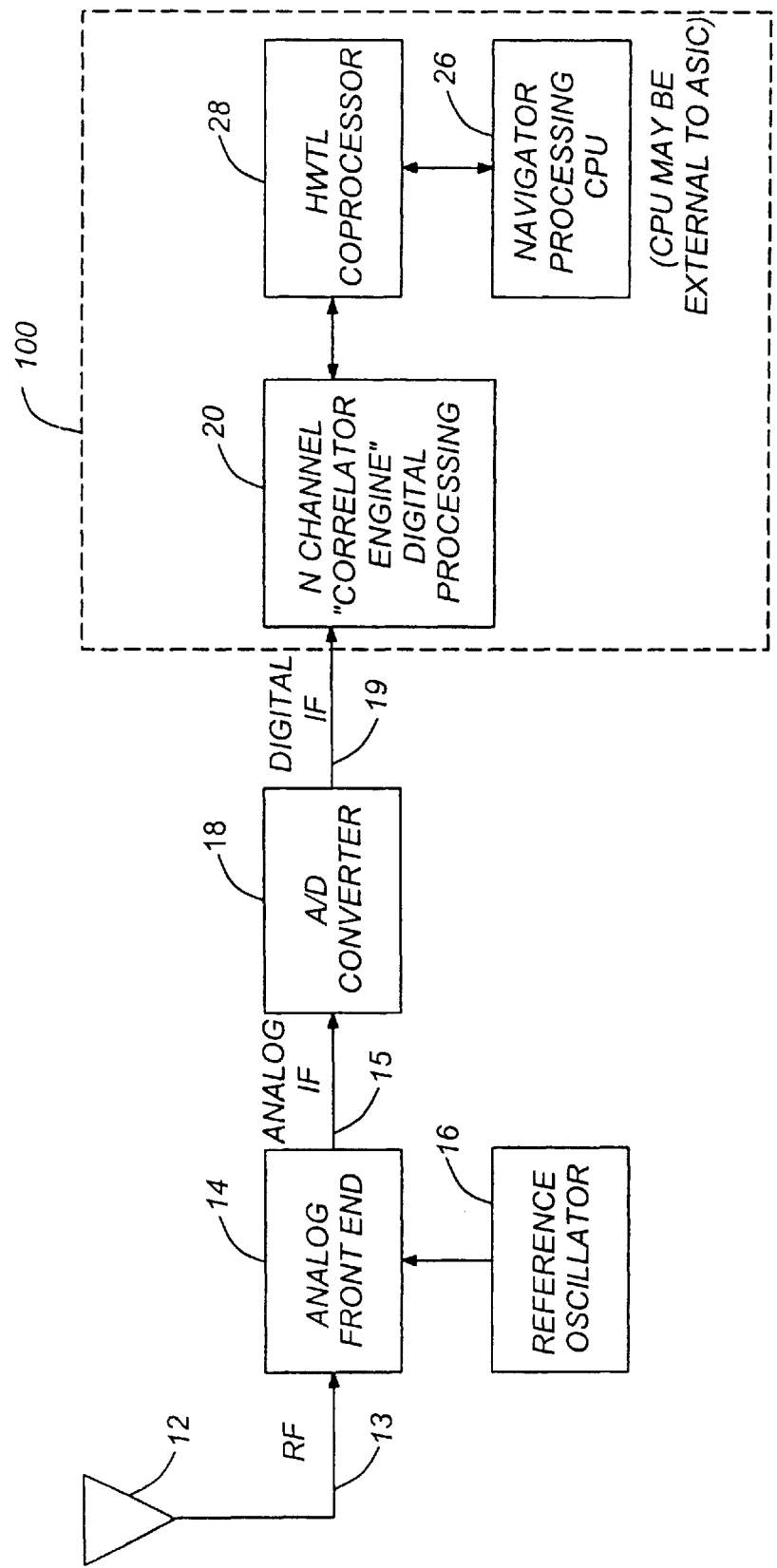
FIG. 2 is a block diagram illustrating a radio receiver comprising an autonomous HWTL chip provided in accordance with the principles of this invention.

FIG. 2 illustrates an autonomous advanced digital signal processing chip ("HWTL chip") 100 provided in accordance with the principles of this invention. The term "HWTL chip" may also be referred to herein interchangeably with "HWTL ASIC" or "HWTL integrated circuit") HWTL chip 100 comprises in the preferred embodiment a digital Correlator Engine ("Correlator") 20, a CPU 26, and a HWTL coprocessor 28 operating under the direction of the on-board CPU 26. Correlator Engine 20 receives an IF signal 19 and performs GPS signal processing including, such as: C/A code capture, Doppler rotation, correlation with a replica C/A code, coherent & noncoherent integration and an 8 bin frequency correlation. Table 2 illustrates one functional objective of the HWTL chip 100 provided in accordance with the principles of this invention

TABLE 2

Receiver Functionality vs. Processing Rate Frequency

| | FUNCTIONALITY | | |
|---|---|---|---|
| | Signal Sampling & Correlation (i.e., correlation, replicating P or C/A code) | Receiver Processing (i.e., Tracking Loops, Bit Synchronization, Data Demod, etc.) | Navigation & Other Processing (i.e., Calculations of Position & Time, User Applications) |
| Processing Frequency | High rates (i.e., 50 MHz to 1 KHz) | Medium rates (i.e., 1 KHz to 10 Hz) | Low rates (i.e., 10 Hz and slower) |
| HWTL ASIC 100 (FIG. 2) | HWTL Chip on-board Correlator Engine 20 (alternatively, external to HWTL ASIC) | HWTL chip on-board HWTL Coprocessor 28 (performs receiver processing) | HWTL chip on-board CPU 26 (performs navigation & other processing- alternatively, external to HWTL ASIC) |

Figure 3:
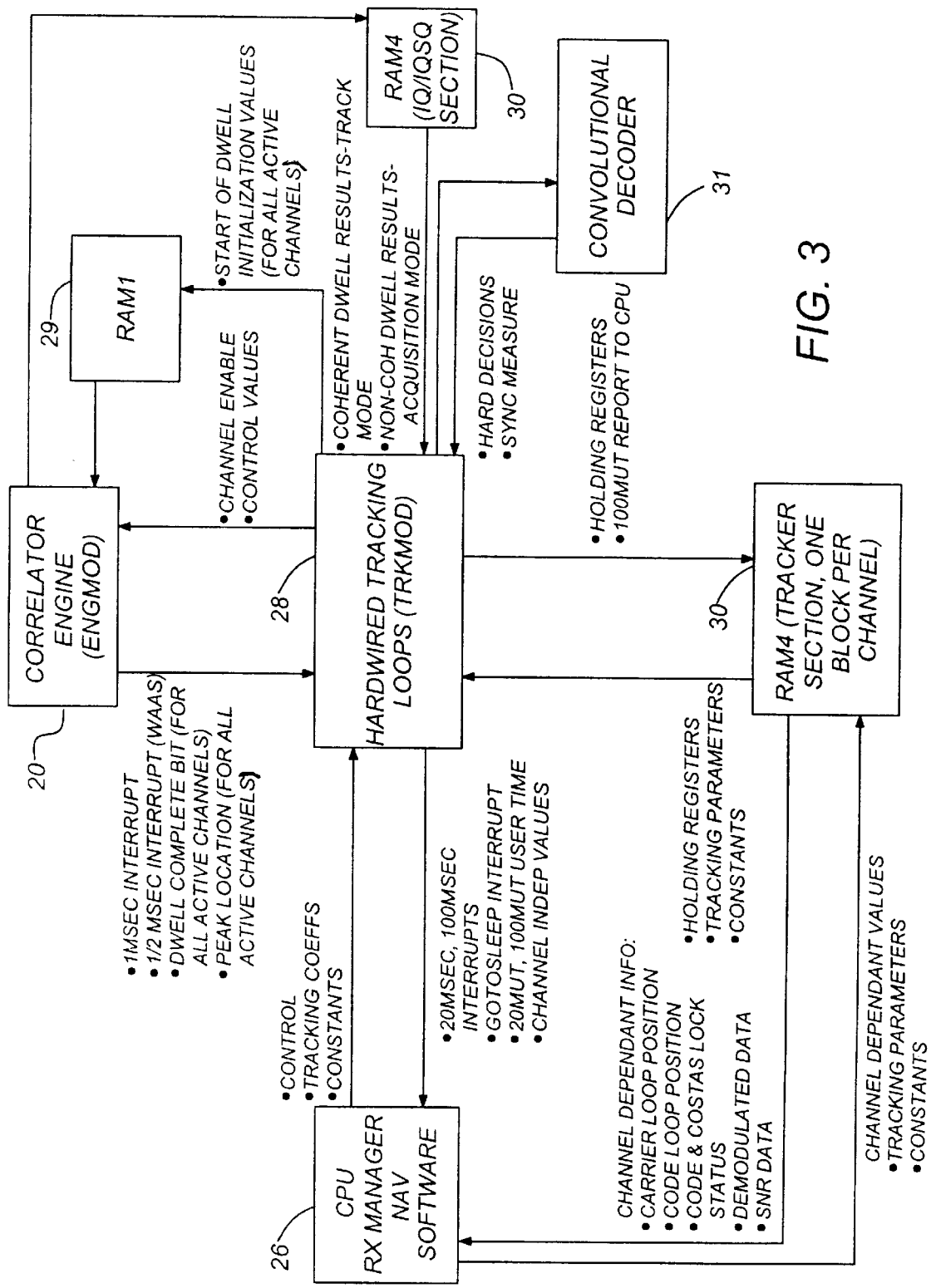
FIG. 3 is a block diagram describing a functional signal flow of the HWTL coprocessor of FIGS. 2 and 3.

FIG. 3 illustrates the HWTL functional signal flow. Data is passed both directly and indirectly between navigation processing CPU 26, HWTL coprocessor 28 and Correlator Engine 20. Data is passed indirectly through the use of two on board storage devices, such as SRAM 29 and 30 (or RAM1 and RAM4, respectively.) RAM1 is used by Correlator Engine 20 as the first buffer of a double buffer scheme for track and acquisition dwell initialization parameters. RAM4 is a multipurpose RAM. Coherent and noncoherent accumulations are dumped to RAM4 by Correlator Engine 20. HWTL coprocessor 28 uses RAM4 as a scratchpad to store channel specific registers and coefficients. This section of RAM4 is partitioned into channel address spaces of 128 words deep per channel.

Generally, CPU 26 directly programs HWTL coprocessor 28 with coefficients and values that are applicable to all channels (channel independent). Values that are specific to a channel (channel dependant) are programmed by CPU 26 into that channel's address space in RAM4.

HWTL Coprocessor 28 Top Level Block Diagram

Figure 4:
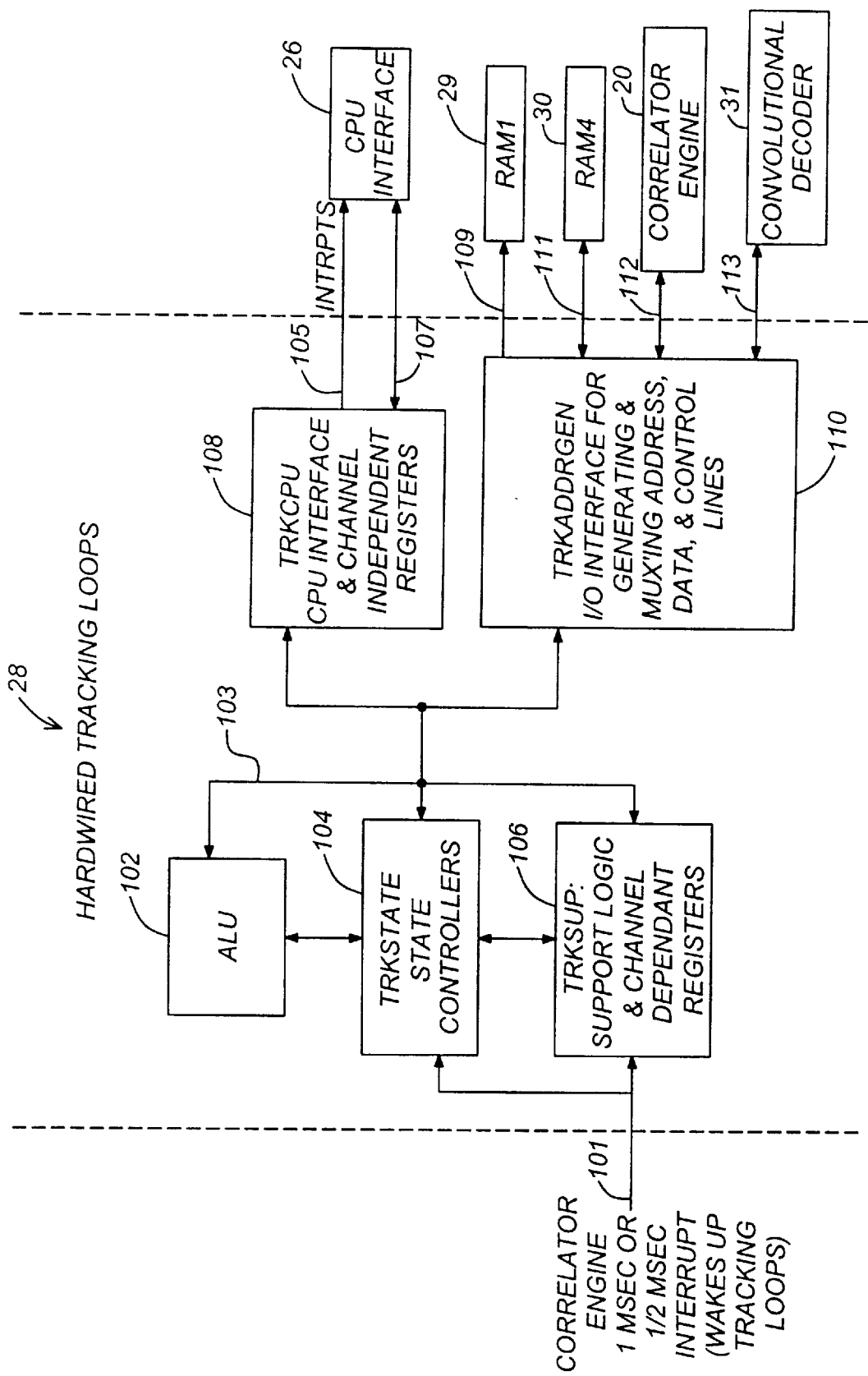
FIG. 4 is a more detailed block diagram describing the HWTL coprocessor of FIG. 2.
Figure 5:
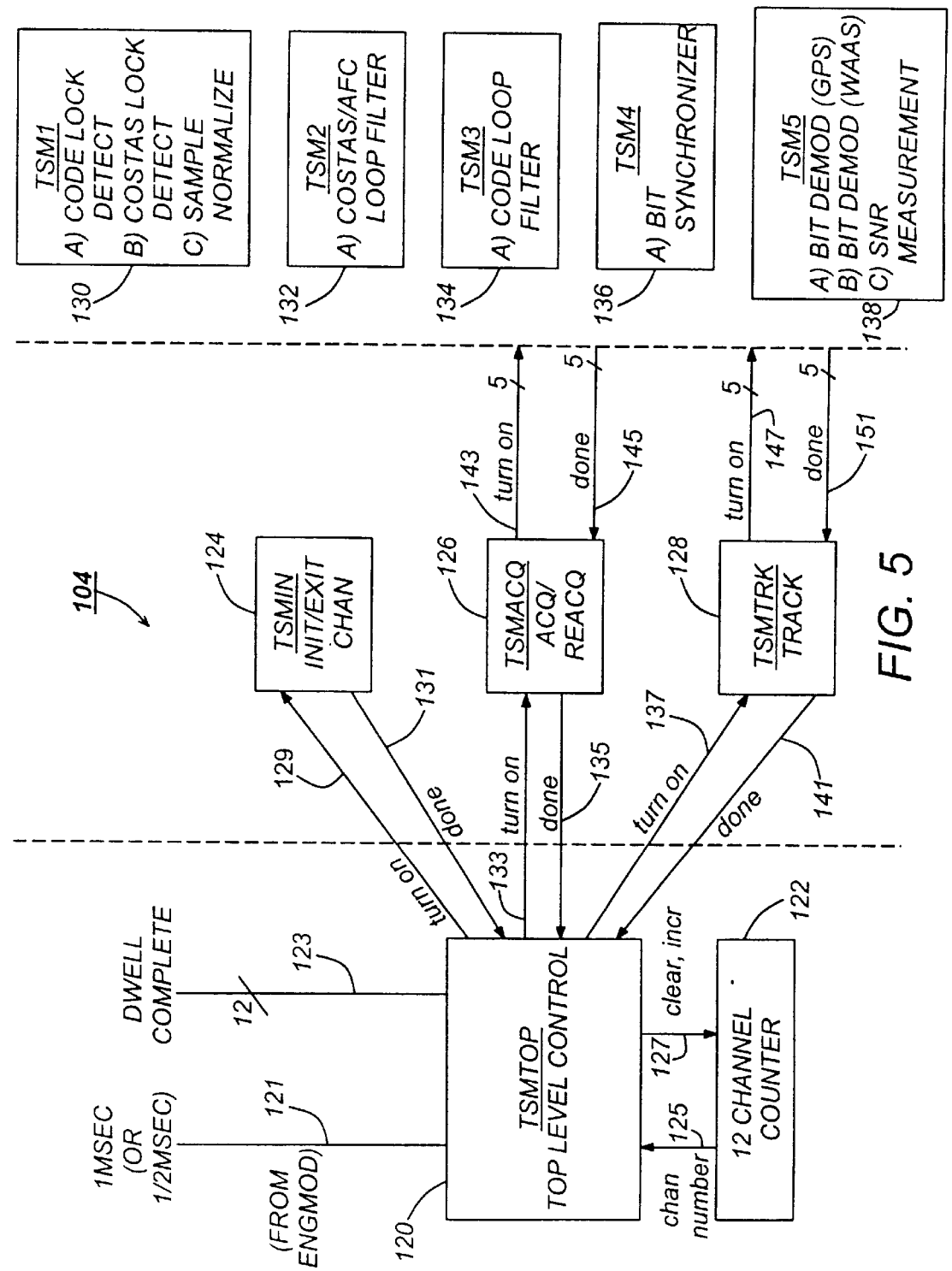
FIG. 5 is a more detailed block diagram describing the HWTL State Controller (TRKSTATE) of FIG. 4.

FIG. 4 illustrates a top-level functional block diagram of HWTL coprocessor 28 of FIG. 2. FIG. 5 illustrates a more detailed block diagram of HWTL coprocessor 28 which comprises five submodules: ALU 102, TRKSTATE 104, TRKSUP 106, TRKCPU 108, and TRKADDRGEN 110.

Functional control of HWTL coprocessor 28 resides in the HWTL state controllers provided in TRKSTATE module 104. Select and enable lines from TRKSTATE 104 allow registers in all remaining modules of HWTL coprocessor 28 to be updated, while controlling data flow between HWTL coprocessor 28, Correlator engine 20, RAM1 and RAM4.

TRKSTATE Module Operation

FIG. 5 illustrates a more detail block diagram of TRKSTATE 104 that provides all the control state machines of HWTL coprocessor 28. As shown in FIG. 5, the control state machines of HWTL coprocessor 28 are organized into three levels. The first and top level comprises TSMTOP 120, which provides primary control and calls and passes control as needed to a second level of HWTL coprocessor state machines. The second level comprises TSMIN 124, TSMACQ126, and TSMTRK128. These second level state machines call state machines from a third level, comprising TSM1 130, TSM2 132, TSM3 134, TSM4 136, and TSM5 138.

Figure 6:
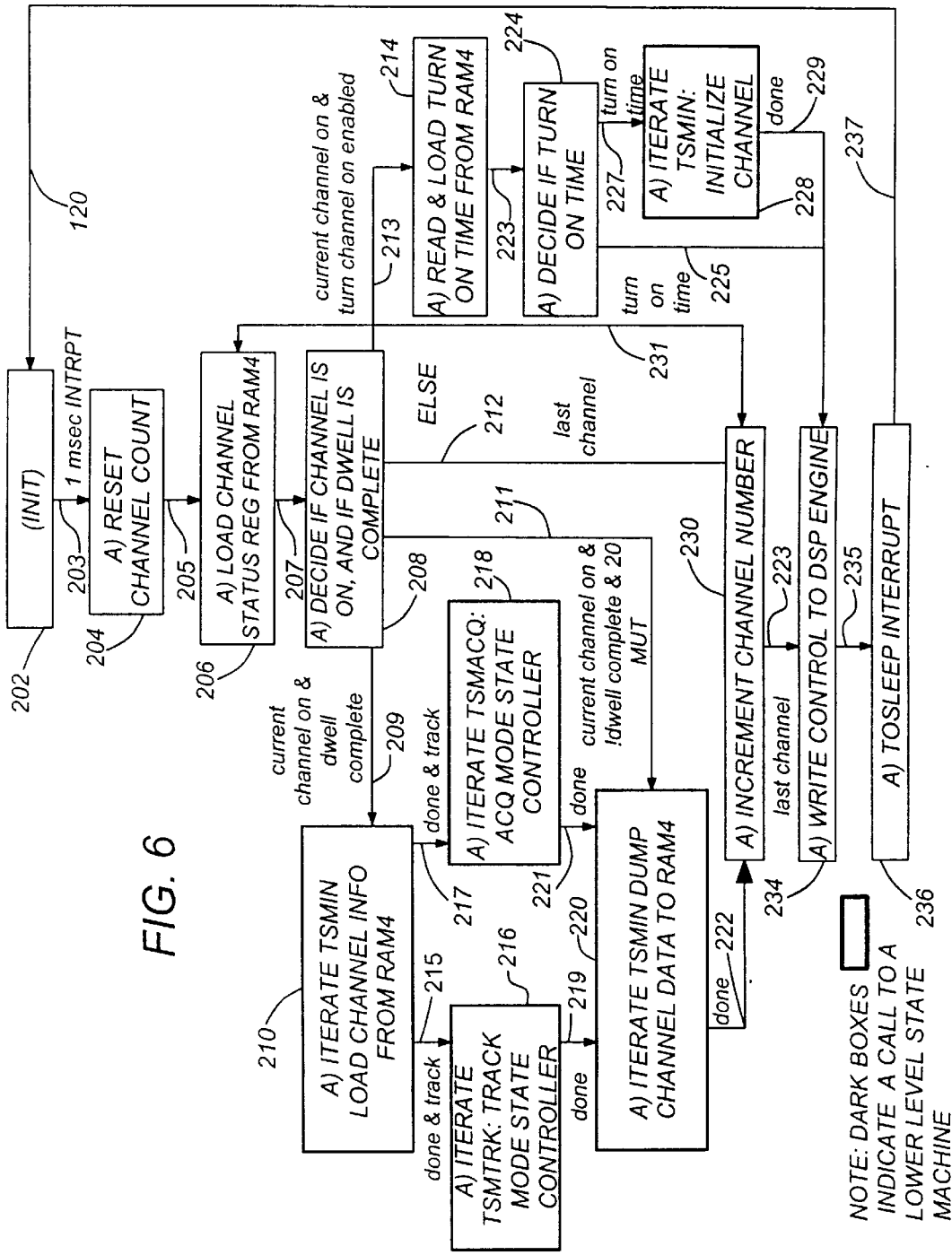
FIG. 6 is a more detailed block diagram describing the HWTL Top Level State Controller (TSMTOP) of FIG. 5.

FIG. 6 illustrates a flow chart of the top-level state controller TSMTOP 120. State machine TSMTOP 120 is activated every millisecond (or every ½ msec for a WAAS receiver application) via an interrupt signal from Correlator engine 20. As detailed in the flow chart illustration of FIG. 6, once initiated, state machine TSMTOP 120 then proceeds to cycle through twelve channels to determine if each channel is active or needs to be turned active (i.e.—has already been turned on, or needs to be turned on for the first time). Although twelve channels are used herein as an illustration, it is envisioned that in alternative embodiments, variation in the number of channel chosen is contemplated as within the scope of this invention. In cycling through the channels during execution of TSMTOP 120, TSMTOP 120 state machine checks one by one whether each channel is already turned on or needs to be turned on. In order to turn on a channel the CPU programs in RAM4 a modulo 100 msec user time for TSMTOP 120 to turn on that channel. If that time matches the current 100 mut time (as determined by a modulo 100 millisecond user time counter in the TRKSUP106 module), then the TSMIN state machine 124 is activated by TSMTOP 120 in an initialize channel mode to initialize that channel for the first time. On the other hand, if the channel has already been turned on and needs to be processed (because of a dwell completed from the Correlator Engine 20), then TSMTOP 120 instead executes TSMIN 124 in setup HWTL channel mode to set up the HWTL coprocessor 28 to process that channel. This comprises primarily of loading channel specific values from RAM4 into HWTL coprocessor 28. TSMTOP 120 then executes either TSM-ACQ 126 (if the channel is in initial acquisition or reacquisition mode) or TSMTRK 128 (if the channel is in track mode). After TSMACQ 126 or TSMTRK 128 completes its processing, TSMTOP120 turns on TSMIN 124 once more, but this time in an exit sequence (or cleanup mode), to provide any needed clean up (including saving the 100 mut report in RAM4 if necessary) before proceeding to the next channel.

Thus, the TSMIN 124 state machine can be activated by TSMTOP 120 in one of three modes: initialize channel mode, set up HWTL hardware mode, or cleanup HWTL hardware mode. The initialize channel mode is used only when a channel is turned on for the first time. The set up HWTL hardware mode and cleanup HWTL hardware modes are used every time a channel is processed following a dwell complete from the Correlator engine for that channel, to load data from RAM4 into hardware at the start of channel processing and to store data back to RAM4 upon completing channel processing, respectively.

Figure 7:
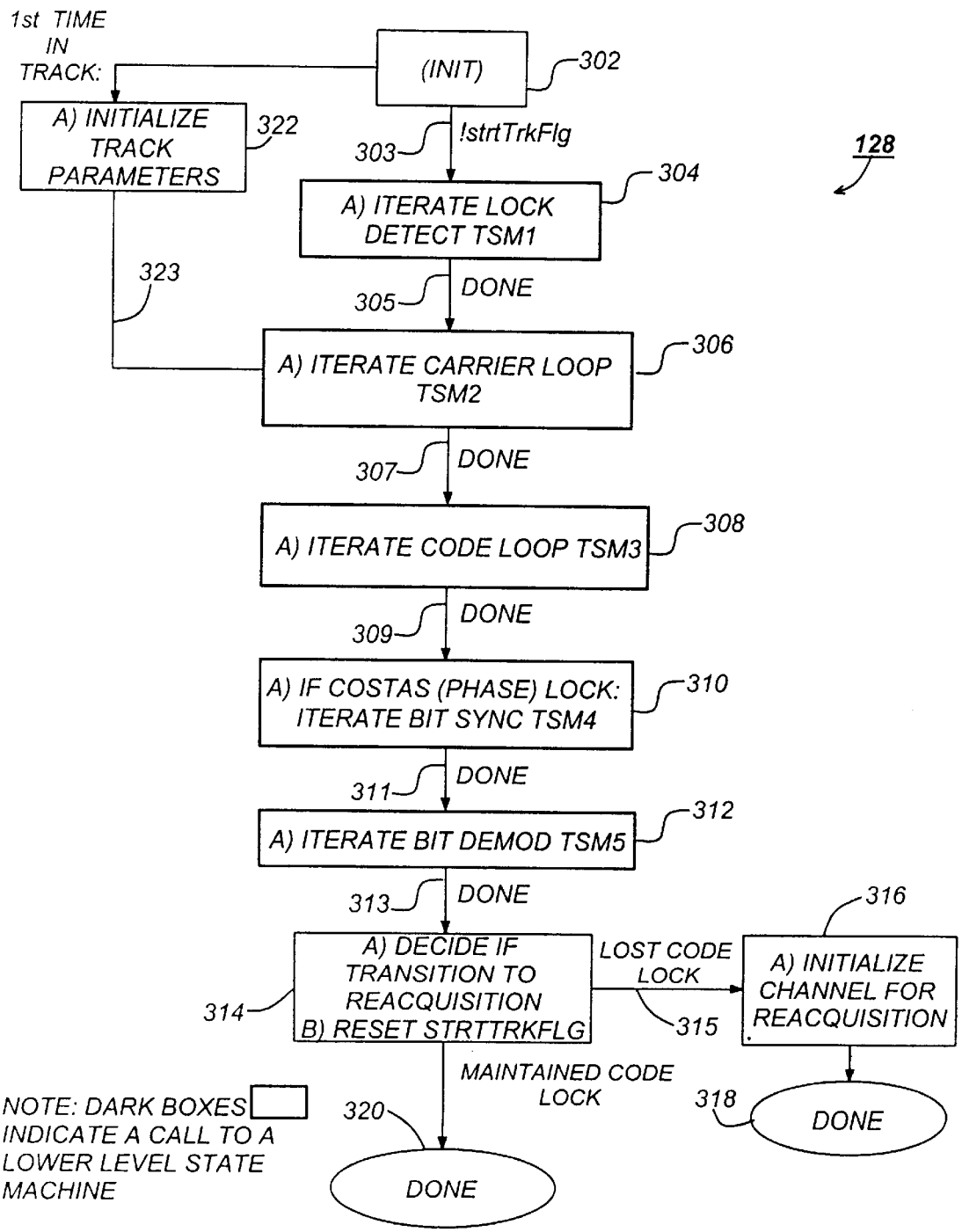
FIG. 7 is a more detailed block diagram describing the HWTL Track State Controller (TSMTRK) of FIG. 5.

FIG. 7 shows the basic flow of the TSMTRK128 track mode controller state machine, including the activation of third level state machines: TSM1 130, TSM2 132, TSM3 134, TSM4 136, and TSM5 138. These third level state machines perform much of the actual signal processing to acquire a signal, such as to lock on to it and extract data from it. TSM1 130 is activated to perform a code lock detect. This operation analyzes the correlator outputs to determine if a signal level is present large enough relative to noise to indicate a true code being present. TSM1 130 also performs a costas lock (phase lock) detect to determine if most of the signal power is consistently present mainly in the I (in phase) vs. Q (quadrature) component of the sampled signal. TSM2 132 is activated to perform costas and AFC carrier loop functions. These are methods of using the sampled I and Q to dynamically track the "motion" of the carrier (L1) signal by matching to its phase and frequency variations. TSM3 134 is activated to perform code loop functions. The code loop tracks the "motion" of the code modulated onto the carrier by determining and following the positions where the code transitions from high to low or low to high. TSM4 136 is activated to perform bit synchronization. This is the process of determining where the 20 millisecond modulated data bits begin and end on the signal. This 20 millisecond data contains the satellite information for the CPU software to determine where the satellites are transmitting from. Finally TSM5 138 is activated to perform data demodulation. This is the process of accumulating the sampled I signal for 20 milliseconds to determine if each 20 millisecond modulated data bit has a value of zero or one. TSM5 138 also collects data for signal to noise ratio calculations.

Figure 8:
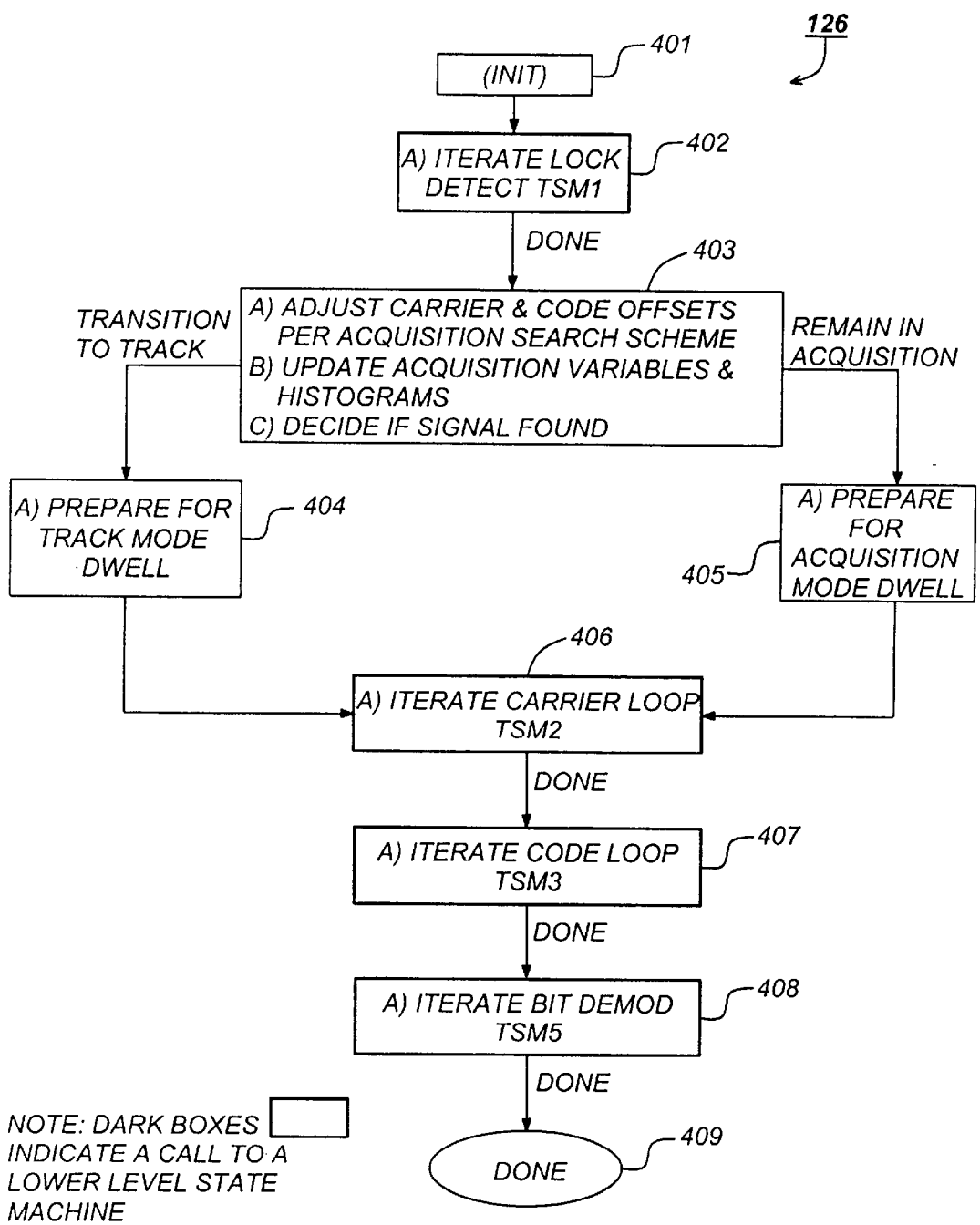
FIG. 8 is a more detailed block diagram describing the HWTL Acquisition Controller (TSMACQ) of FIG. 5.

FIG. 8 shows the basic flow of the TSMACQ 126 acquisition mode controller state machine used to perform initial acquisition and reacquisition. As described above for TSMTRK 128, TSM1 130 is turned on to perform the code lock detect. TSM2 132 performs the carrier loops operations. TSM3 134 performs the code loops operations. TSM5 136 performs data demodulation and collects data for signal to noise ratio calculations. Actually, in acquisition TSM5 does not perform a true data demodulation since this is not possible until the signal has been locked on to in track, but it does collect information useful to software and maintains placeholders.

In addition to these basic third level state machine functions, the TSMACQ 126 state controller controls and steps the Correlator engine 20 through the code (time) and doppler (frequency) space to search for the presence of a GPS satellite signal. TSMACQ 126 is programmed by CPU 26 with parameters that determine the strategy of how to search for the signal and the criteria for determining that the signal is truly there. This includes repeating correlation in a particular code/doppler position once lock threshold is exceeded and comparing the peak value to neighboring peaks to decide which truly contains the signal. It also includes the strategy of how to proceed if a code/doppler position is rejected.

ALU Module Operations

Figure 9:
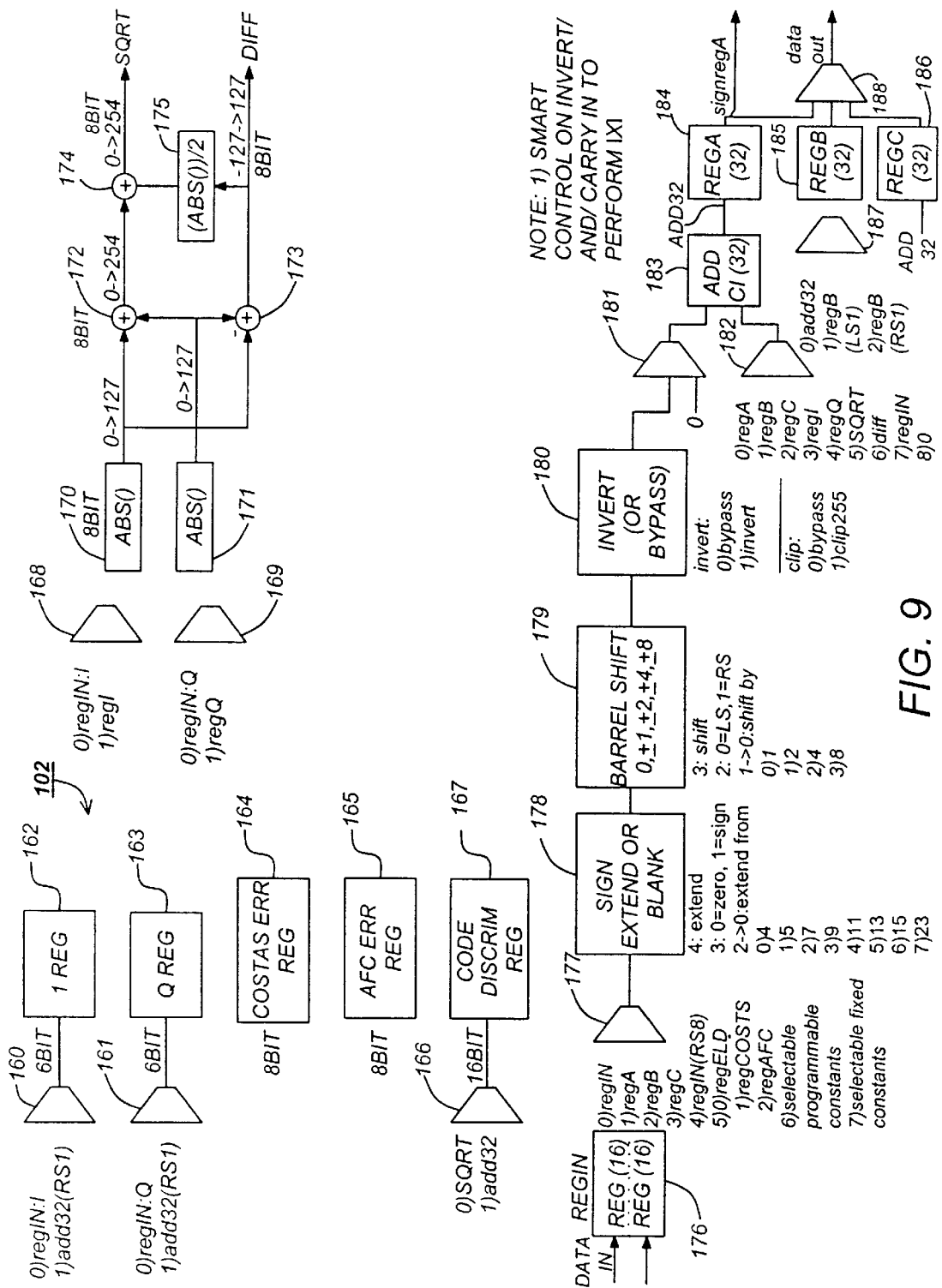
FIG. 9 is a more detailed block diagram describing the HWTL ALU of FIG. 4.

FIG. 9 illustrates in more detail the ALU module 102 of FIG. 4 that performs much of the word wide (16 or 32 bit) data path calculations for the HWTL coprocessor's functions. ALU 102 is directed by control signals from TRK-STATE module 104 of FIG. 4 that selects data paths and enable registers. In this example, ALU 102 receives a 16-bit wide data from RAM4 and stores that data in a 32 bit wide input register REGIN 176. ALU 102 then outputs results back to RAM4 30 of FIG. 3, which is also provided to state controller TRKSUP 106, and to TRKADDRGEN 110 of FIG. 5. In the preferred embodiment, the ALU 102 comprises three primary 32-bit storage registers: REGA 184, REGB 185, and REGC 186. In addition, for convenience of operation, several smaller registers, i.e., I REG 162 and Q REG 163, COSTAS ERR REG 164, AFC ERR REG 165, and CODE DISCRIM REG 167, are provided to store values such as I & Q, costas error, AFC error and code discriminator to avoid shifting these values too many times back and forth from RAM4. ALU 102 accommodates input data in several forms and can sign or zero extended from several bit positions (as required to implement the signal processing). The data can right or left barrel shifted by 1, 2, 4 or 8 places. It can also be 1's or 2's complement inverted. Finally, selected data is then fed into a 32-bit adder 183 before being stored in REGA 184, REGB 185, or REGC 186.

TRKSUP Module Operations

TRKSUP module 106 comprises of assorted circuit logic provided to support the signal processing, and acquisition scheme, and maintain flags and mode registers (mostly channel specific that are accessed from RAM4, updated, and stored back in RAM4). TRKSUP 106 provides the following functionality for example and can be implemented in a number of various well known circuit designs that provide such functions:

1) User time counters to maintain 20 mut & 100 mut (one for all channels)
2) Channel time counter to maintain 20 mct (channel specific)
3) Code tap and frequency bin counters
4) Integrate and dump counter for code and costas lock
5) Jsync & Ksync flags (code & costas lock indicators)
6) Bit sync flag
7) Track mode flag
8) Shift register & counter to support shift & add multiplies
9) G1/G2 lookup support logic (The G1/G2 values are used to properly initialize the CA coders that generate the pseudo random code employed by GPS)
10) Sample normalizer up/down counter
11) Data demodulator shift register
12) Acquisition algorithm support logic (histogram bins, code & doppler step counters)

All these functions can be provided with discrete logic in the form of up counters, up/down counters, single bit register flags, multiple bit wide registers and shift registers. All of their functionality could have been performed by the ALU 102, but they are used to provide storage on a channel by channel basis to mitigate the need of repeatedly reading and storing data in RAM4 while a single channel is being processed. They also provide more specialized capability since they are implemented with discrete logic rather than software.

TRKCPU Module Operations

The primary function of TRKCPU module 108 (see FIG. 4) is to handle the interface between HWTL coprocessor 28 to CPU 26. The functionality provided includes:

1) CPU interface
2) CPU programmable parameter storage registers (generally values that are non-channel specific, i.e.— one value applies to all twelve channels, so that is not necessary to take up twelve locations in RAM4)
3) Channel enabled registers—indicates which of the 12 available channels has been turned on. It provides the capability for a channel to be turned on at any time modulo 100 mut or turned off immediately
4) Override control—allows the CPU of override the autonomous algorithm of the tracker and force things such as: transition from track to reacquisition, the type of track to reacquisition transition, clearing and redetermination of bit sync, and transition to multipath.
5) Multiplexes from stored parameter values as determined by mode. This allows the CPU to provide a set of parameters up front and then the HWTL can decide which values to use.
6) Latches the data ready (dwell complete) interrupts from the Correlator engine.

TRKADDRGEN Module Operations

The primary operations of TRKADDRGEN module 110 (FIG. 4) comprises generating control signals and addressing to access RAM1, RAM4, and Correlator engine 20. TRKADDRGEN module 110's operations comprises:

1) Address and write strobe generation for RAM1—selects region of RAM1 to access as dictated by channel counter value.
2) Address and read/write request generation for RAM4—selects region of RAM4 to access as dictated by channel counter value and whether access is to the Correlator Engine 20 dumps, tracker channel scratchpad area, or G1/G2 lookup table area.
3) Address and write strobe generation for Correlator engine—selects region of Correlator engine address space to access as dictated by channel counter value.
4) Data out mux—multiplexes data from various sources (ALU, TRKSUP, etc) to send out to RAM1, RAM4, and the Correlator engine.
5) Channel counter—used by TSMTOP to cycle through the 12 channels to process successively any active channels.
6) Enable generator—produces a divide by 2 enable of the master clock to allow multiple cycles for long data path processing (primarily in the ALU). Most data paths and enabling of registers is gated with this enable, creating an effective data path time of approximately 40 nsec. In addition, accesses to RAM4 are controlled by a handshake acknowledge from RAM4 in response to a TRKMOD read/write request. If RAM4 does not immediately acknowledge, then wait states are implemented by delaying this enable signal.

Thus, in the preferred embodiment of HWTL coprocessor 28, except for restricting Initial Acquisition to channel 0, HWTL coprocessor 28 provides 12 independent tracking/reacquisition channels with the following capabilities:

(1) Initial Acquisition,
(2) Reacquisition,
(3) Carrier and Code loop tracking,
(4) Bit sync algorithm,
(5) Data demodulation, and
(6) 100 ms Status buffering After a channel has been initialized, HWTL chip 100 autonomously searches for the programmed satellite, acquires carrier and code synchronization, performs bit synchronization, demodulates GPS data, and provides range data, SNR data, and lock/operational status at a 10 Hz interrupt rate. If the signal is lost, the Tracker automatically enters the Reacquisition State, repeatedly searching a programmed time/frequency uncertainty window until the signal is recovered or until software disables the channel and reprograms the search parameters and SVID.

Systems Level Description of HWTL Functionality

Typical tracking and acquisition operations of HWTL coprocessor are next described from a "systems" perspective, rather than the more "mechanical" implementation point of view utilized to this point.

Initial Acquisition Function Overview

As illustrated in FIG. 8, in Initial Acquisition, Channel 0 searches the estimated time uncertainty at a fixed rate of 118 chips/non-coherent dwell and searches Doppler at ⅞ths of the 8 bin frequency window. The following search parameters are programmable:

1. Coherent dwell and non-coherent dwell,
2. Time search and type (swept or expanding), 3. Doppler search (swept or expanding),
4. False Alarm rate (sync threshold setting),
5. Start time delay (1 to 99 ms)
6. Number of searches before 'Acquisition Fail' status flag is set.

Initial Acquisition Search Algorithm

Initial Acquisition uses a histogram approach to synchronize Doppler and time to within ¼ of the frequency filter bandwidth and ¼ of a C/A code chip, respectively. After a non-coherent dwell, the Tracker reads the peak magnitude from the engine and compares it to a sync threshold. If the signal level does not break threshold, the Tracker waits for the next dwell that will cover the next 118-chip time slice. However, if the threshold is exceeded, the algorithm clears an 8-filter by 3-tap histogram centered in time at the peak tap, and initializes the peak tap/filter bin to a value of one. At subsequent dwells, if the peak exceeds threshold and lies within the histogram's 3×8 time-frequency window, the respective histogram bin is incremented while all others are decremented (minimum of zero). If the peak does not exceed threshold or exceeds threshold but is not in one of the 24 bins, all bins are decremented. When a bin reaches a programmable count of nominally 4 (except for any tap in frequency filter bin number 4, which is automatically dismissed at a programmable count of nominally 4), the search algorithm proceeds to the verify cycle, whose purpose is to mitigate aliasing caused by high SNR signals. In the verify cycle, the carrier Doppler is slewed so that Bin 0, or the DC bin, is centered on the signal. If the signal is an alias, bin 0 will be centered near a sin(x)/x sampling null, and will not be verified. The Tracker switches to track-mode if the signal is verified a programmable number of times. If after searching the time/frequency window the programmed SVID is not detected, the search algorithm sets the 'Acquisition Fail' status flag.

Reacquisition Overview

There are two reacquisition modes: (1) 'normal' and (2) 'resume'. In a 'normal' reacquisition, the Tracker always begins its search relative to its current carrier loop Doppler estimate and code loop phase estimate. The Tracker selects the normal mode only if bit sync has been completed; otherwise, the 'resume' mode is selected. The 'resume' mode is implemented to mitigate false detects. Thus, when a channel falls out of track mode because it has locked to a frequency or code sidelobe, it will use as its reference point the Doppler and code phase saved from the last reacquisition search step, i.e., it will resume its search as if it had just dismissed the last dwell position.

The core reacquisition algorithm is the same for both modes. The Tracker searches time in fixed 10 chip steps, and although the carrier Doppler step size is programmable, 750 Hz is the baseline step size. As with initial acquisition, the number of Doppler and code steps, the false alarm rate, dwell period, and search type (expanding or swept) are programmable. Except for reducing the histogram from 24 tap/filter bins to 3 taps, the reacquisition algorithm is identical to the initial acquisition histogram search. On the first detection, the histogram is centered and the center bin is set to 1 and the neighboring tap bins are zeroed. Subsequent sync detects increment the respective bin and decrement the other two until the peak bin reaches the programmed threshold count (baseline is 4 for $P_{FA}=0.1$) or all three bins decrement to zero. If the peak reaches the threshold count, the coder is slewed to move the peak tap over to the punctual pull-in tap, tap 0, and the Tracker switches to track mode. If all three bins decrement to zero, the code phase is stepped 10 chips and the procedure continues.

Tracking Function Overview

FIG. 7 illustrates an example of the tracking process of HWTL coprocessor function of track mode provided by Track State Controller (TSMTRK) 128. While in the track mode, TSMTRK 128 (or also referred herein as "the Tracker") uses a composite AFC/Costas carrier tracking loop to acquire and maintain carrier phase synchronization, and a first order code loop with frequency aiding from the carrier loop to maintain code phase or time synchronization. The coherent dwell or iteration period is fixed at 1 ms, but the following parameters are programmable:

1. AFC loop bandwidth, either $1^{st}$ or $2^{nd}$ order, and can be disabled if Costas locked,
2. Costas loop bandwidth and either $2^{nd}$ or $3^{rd}$ order, Code loop bandwidth, and either conventional ½ chip Early-Late (E–L), narrow E–L, or multipath discriminators.

Support Functions

In addition to the AFC/Costas Carrier loop and Code loop, the hardwired tracker performs several functions in order to determine when to transition between acquisition and track, determine bit sync, and extract demodulated data. These include the Code and Costas Lock Detectors, Bit Synchronizer, and Data Demodulator.

Code and Costas Lock Detectors

Code lock and Costas lock detectors with 100 ms update intervals are provided. At the end of a 100 ms integrate and dump period, the code lock (or signal lock detector) compares to a sync threshold the quotient of the mean signal envelope divided by the mean signal plus noise envelope, and if the quotient exceeds threshold, the 'Code Lock' status bit is set in the 100 ms status report and an 'unlocked' status counter is cleared. If the quotient is less than the threshold, the 'unlocked' status counter is incremented. If the counter ever reaches its programmed threshold, the Tracker will exit to reacquisition mode. This 'unlock' status counter is incorporated to delay entry into the reacquisition cycle until there is a very high probability that the signal has been lost. The Costas lock detector compares the mean $|I|-|Q|$ value to a sync threshold. The averaging (integration) time is 100 ms.

Bit Synchronization

After achieving Costas lock, 1 ms I samples are filtered by a 20-tap moving-window filter and the absolute value of the filter is applied to one of 20 bins of a histogram. The bin address to which the filter is added is equal to the state of the modulo-20 20 ms user time counter. After approximately 40 bits, the magnitude of the peak histogram bin and its two neighboring bins are used to compute the location of the bit edge relative to the state of the modulo-20 20 ms user time counter. For example, if the neighboring bin that is later in time than the peak bin is larger than the early bin, the edge resides somewhere in the late bin's 1 ms coherent integration interval. Conversely, if the early bin is larger than the late bin, the edge resides in the peak bin's 1 ms coherent integration interval. When the early and late bin magnitudes are comparable to each other, noise can introduce a 1 ms error because the bit edge is either very late in the peak bin's 1 ms integration period or very early in the late bin's 1 ms period. For these cases, the code chip number is used to decide the correct bin: if the chip number is very small, the bit edge occurs late in a 1 ms period, so the edge must reside in the peak bin; if the chip number is very large, the bit edge occurs early in a 1 ms period, and therefore, the edge must reside in the late bin.

Data Demodulation

After bit sync, de-normalized I and Q samples are accumulated over 20 ms. At 20 ms channel time, (1) the absolute values of the accumulators are accumulated, (2) the sign bit of the I accumulator is shifted into the channel's data buffer, (3) the 20 ms 'badlock' and 'badphase' status bits are shifted into their respective status buffer, (4) the No (noise-floor) 20 ms accumulator is absolute-valued and accumulated, and (5) the I, Q, and No accumulators are then dumped.

100 ms Status Reports

At every 100 ms interrupt, each channel writes the following data items to a RAM4 buffer as a 100 ms CPU report:
  (1) 4, 5, or 6 GPS hard decision data bits (5 nominal), (this is the 20 millisecond demodulated data)
  (2) Modulo-20 20 ms channel time at 100 ms user time epoch,
  (3) Modulo-1023 PN chip number at 100 ms user time epoch,
  (4) 16-bit Code phase at 100 ms user time epoch,
  (5) 32-bit Carrier delta-phase over last 100 ms,
  (6) 32-bit Carrier Doppler estimate (2.046 MHz/$2^{32}$),
  (7) |I| and |Q| Accumulation (for 4, 5, or 6 bits),
  (8) |No| Accumulation (for 4, 5, or 6 bits),
  (9) 'Badlock' status, 1 per 20 ms bit,
  (10) 'Badphase' status, 1 per 20 ms bit,
  (11) Track/Acq status, Code lock status, Costas lock status, Bitsync status WAAS Processing One channel of the hardwired tracking loop can act as WAAS receiver channel. Processing of the WAAS channel is similar to processing of GPS channels with the following differences. The WAAS channel is iterated at a ½ msec rate so that carrier and code loops and the code and costas lock detectors are iterated every ½ msec. The ½ msec coherent dwell resolution allows the 2 millisecond WAAS soft symbols to be divided into four bins for bit synchronization and data demodulation. Further, two symbol pair soft decisions are fed into a convolutional decoder to obtain hard decision data bits at a 4 msec rate. First, one pairing of soft symbols into the convolutional decoder is attempted and if the resultant sync measure is too large, then the other pairing is tried until hard decision bit sync is obtained.

The 100 mut status report for the WAAS channel will contain 24, 25 or 26 hard decision bits saved up from the past 100 milliseconds, as well as a corresponding number of I, Q and noise accumulations. If the WAAS channel is enables then the entire hardwired tracking loop and engine operates in ½ millisecond mode. This means that all coherent dwells (except for initial acquisition) can be programmed in increments of ½ milliseconds. This results in performance advantages for reacquisition.

CPU Oversight

The CPU is required to program the HWTL with initial values as to the search and tracking parameters for desired satellite channels. Thereafter, the CPU collects GPS data and phase information at a 100 millisecond rate to perform navigation functions. The CPU can also disable (ignore) the 100 millisecond interrupts from the HWTL for extensive periods of time (on the order of several seconds) while the HWTL continues its acquisition and tracking functions without CPU supervision. Thus, when the CPU re-enables the HWTL coprocessor's 100 millisecond interrupt it returns to channels that have been continuously tracking and can make position estimates almost immediately from code position.

Thus, the HWTL integrated circuit comprising a HWTL coprocessor provided in accordance with the principles of this invention provides a lower cost, lower real estate implementation of a radio receiver. Providing a HWTL coprocessor allows the CPU in the radio receiver to allocate more processing bandwidth for lower frequency rate operations such as navigation and user applications that are in the range of lower than 10 Hz, while offloading the higher frequency signal processing to the HWTL coprocessor and the Correlator engine. The radio receiver architecture in accordance with the principles of this invention thus addresses the need to minimize power consumption in the typical radio receivers to thereby better accommodate the industry trend to embed radio receivers in small, portable consumer devices.

Although in the preferred embodiment, Correlator 20, CPU 26 and HWTL coprocessor 28 are integrated on a single ASIC, it is contemplated that either or both CPU 26 and Correlator 20 can conceivably be implemented external to HWTL chip 100. Moreover it is understood that although, in this described example, we often referred to the implementation of the HWTL coprocessor as for either a GPS or WAAS radio receiver, it is contemplated as within the scope of this invention that the principle of a HWTL coprocessor in a radio receiver is applicable to a variety of radio receiver applications in addition to GPS and WAAS applications.

Foregoing described embodiments of the invention are provided as illustrations and descriptions. They are not intended to limit the invention to precise form described. In particular, Applicant(s) contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

What is claimed is:

1. An autonomous hardwired tracking loop (HWTL) integrated circuit comprising:
  a HWTL coprocessor coupled to receive an IF signal from a correlator engine, the HWTL coprocessor providing radio signal processing comprising data tracking or acquisition processing on the IF signal to generate HWTL processed data for further radio receiver processing operations by a CPU.

2. The HWTL integrated circuit of claim 1, wherein the HWTL integrated circuit is coupled to the CPU to provide the HWTL processed data to the CPU, wherein the CPU provides navigation and other non-radio receiver processing.

3. The HWTL integrated circuit of claim 1, wherein the HWTL coprocessor provides signal processing operations in a range from approximately 10 Hz to 1 KHz processing rate.

4. The HWTL integrated circuit of claim 1, wherein the HWTL coprocessor comprises:
  a track state module (TRKSTATE) that initiates a set of state machine operations, and also provides a plurality of functional control signals of the HWTL coprocessor comprising one or more select and enable lines; and
  an ALU coupled to the TRKSTATE module to receive the one or more select and enable signal to provide a plurality of data path calculations for tracking, the ALU is also coupled to the one or more on-board memory components for retrieving and storing a set of processed data;
  a track support module (TRKSUP) comprising a set of assorted logic for supporting signal processing and acquisition operations;
  a track CPU module (TRKCPU) for handling interface to the CPU via a bus; and a track address generator (TRKADDRGEN) for generating one or more control lines and addresses for accessing the one or more on-board memory components and the Correlator engine.

5. The HWTL integrated circuit of claim 1, wherein the HWTL coprocessor acquires, tracks and demodulates WAAS data.

6. The HWTL integrated circuit of claim 1, wherein the HWTL coprocessor provides a half millisecond mode operation of the hardwired tracking loop to support WAAS bitsync and data demodulation and to support reacquisition ½ millisecond coherent dwells.

7. An autonomous hardwired tracking loop (HWTL) radio receiver system comprising:
  a correlator engine, the correlator engine receives an IF signal and provides correlation operations to generate a correlated data output;
  a CPU; and
  a HWTL coprocessor coupled between the correlator engine and the CPU to direct passage of data via one or more on-board memory components to the correlator engine or the CPU, wherein the one or more on-board memory components comprises storing a set of parameters associated with data tracking and acquisition operations.

8. The HWTL radio receiver of claim 7, wherein the HWTL coprocessor is integrated on an integrated circuit.

9. The HWTL radio receiver of claim 7, wherein the HWTL coprocessor and the CPU is integrated on a single integrated circuit.

10. The HWTL radio receiver of claim 7, wherein the HWTL coprocessor, the CPU and the correlator comprises an integrated circuit.

11. The HWTL integrated circuit of claim 7, wherein the HWTL coprocessor comprises:
  a track state module (TRKSTATE) that initiates a set of state machine operations, and also provides a plurality of functional control signals of the HWTL coprocessor comprising one or more select and enable lines; and
  an ALU coupled to the TRKSTATE module to receive the one or more select and enable signal to provide a plurality of data path calculations for tracking, the ALU is also coupled to the one or more on-board memory components for retrieving and storing a set of processed data;
  a track support module (TRKSUP) comprising a set of assorted logic for supporting signal processing and acquisition operations;
  a track CPU module (TRKCPU) for handling interface to the CPU via a bus; and a track address generator (TRKADDRGEN) for generating one or more control lines and addresses for accessing the one or more on-board memory components and the Correlator engine.

12. The HWTL radio receiver of claim 7, wherein the HWTL coprocessor acquires, tracks and demodulates WAAS data.

13. The HWTL radio receiver of claim 7, wherein the HWTL coprocessor is coupled to the CPU to provide the HWTL processed data to the CPU, wherein the CPU provides navigation and other non-radio receiver processing.

14. The HWTL radio receiver of claim 7, wherein the HWTL coprocessor provides signal processing operations in a range from approximately 10 Hz to 1 KHz processing rate.

15. An autonomous hardwired tracking loop method (HWTL method) for a radio receiver system having a correlator, a CPU, and a HWTL coprocessor, wherein the HWTL method comprises:
  providing signal processing functions requiring greater than 1 KHz frequency rate by the correlator;
  providing receiver processing comprising data acquisition and tracking function processing by the HWTL coprocessor; and
  providing navigation and non-radio receiver operations by the CPU.

16. The HWTL method of claim 15 wherein the receiver processing comprises signal processing operations at a frequency in a range between approximately 1 KHz to 10 Hz.

17. The HWTL method of claim 15 wherein the CPU navigation and non-radio receiver operations comprises signal processing operations at a less than approximately 10 Hz processing requirements.

18. An apparatus for acquiring and tracking signals received from a plurality of GPS transmitters, comprising:
  an engine for correlating the signals received from the plurality of GPS transmitters; and
  a subsystem communicatively coupled to the engine, the subsystem configured to acquired and track the correlated signals, the subsystem including:
    a subsystem processor, implementing at least one software module that acquires and track the correlated signals according to instructions stored in a memory communicatively coupled to the processor, wherein the instructions include at least one operation implemented in a circuit module.

19. The apparatus of claim 18, wherein the engine correlates the signals received from the plurality of GPS transmitters according to a code position and a doppler value.

20. The apparatus of claim 18, wherein the subsystem is disposed on a single integrated circuit chip.

21. The apparatus of claim 18, wherein the subsystem and the engine are disposed on a single integrated circuit chip.

22. The apparatus of claim 18, wherein the circuit module comprises discreet logic implementing the operations supporting the software modules.

23. The apparatus of claim 18, wherein the circuit module includes memory storage independent of the memory communicatively coupled to the subsystem processor.

24. The apparatus of claim 18, wherein the operations include at least one operation for accessing, updating, and storing data in a counter selected from the group comprising:
  a time counter shared by all of a plurality of channels;
  a channel specific time counter for each of the plurality of channels;
  a code tap counter;
  a frequency bin counter;
  an integrated counter;
  a dump counter;
  a shift register and counter;
  an up/down counter;
  a code step counter; and
  a doppler step counter.

25. The apparatus of claim 18, wherein the operations include at least one operation for accessing, updating, or storing data in stored in a data demodulator shift register.

26. The apparatus of claim 18, wherein the operations include at least one operation for accessing, updating, or storing data in stored in a plurality of histogram bins.

27. The apparatus of claim 18, wherein the operations include at least one operation for setting and resetting a flag selected from the group comprising:

a bit synchronization flag; and a track mode flag.

28. The apparatus of claim 18, wherein the operations include at least one operation for accessing an indicator selected from the group comprising:

a code lock indicator; and a costas lock indicator.

29. The apparatus of claim 18, further comprising a navigation processor.

30. The apparatus of claim 29, wherein the navigation processor and the engine are implemented in the same integrated circuit.

31. The apparatus of claim 30, wherein the navigation processor, the subsystem processor and the engine are implemented in the same integrated circuit.

32. The apparatus of claim 18, wherein the subsystem processor implements a plurality of hierarchically organized software modules, including:

a first software module, communicatively coupled to the engine;

a first set of software modules, each of the software modules operating under control of the first software module.

33. The apparatus of claim 32, wherein the first software module is activated by the engine.

34. The apparatus of claim 33, wherein the first software module is activated by an interrupt signal from the engine.

35. The apparatus of claim 32, wherein the first set of software modules includes:

an acquisition software module for acquiring and reacquiring the signals received from the plurality of GPS transmitters;

a tracking software module for tracking the signals received from the plurality of GPS transmitters.

36. The apparatus of claim 35, wherein the first set of software modules further comprises an initialization software module for initializing the first software module and the second software module.

* * * * *